(12) United States Patent
Chang et al.

(10) Patent No.: US 10,641,946 B2
(45) Date of Patent: May 5, 2020

(54) BACK LIGHT MODULE AND DISPLAY DEVICE

(71) Applicants: Radiant Opto-Electronics (Suzhou) Co., Ltd., Jiangsu (CN); Radiant Opto-Electronics Corporation, Kaohsiung (TW)

(72) Inventors: Chung-Cheng Chang, Kaohsiung (TW); Pei-Fen Hou, Kaohsiung (TW)

(73) Assignees: Radiant Opto-Electronics (Suzhou) Co., Ltd., Jiangsu (CN); Radiant Opto-Electronics Corporation, Kaohsiung (TW)

( * ) Notice: Subject to any disclaimer, the term of this patent is extended or adjusted under 35 U.S.C. 154(b) by 135 days.

(21) Appl. No.: 15/915,041

(22) Filed: Mar. 7, 2018

(65) Prior Publication Data
US 2018/0321435 A1 Nov. 8, 2018

Related U.S. Application Data

(63) Continuation of application No. PCT/CN2017/082834, filed on May 3, 2017.

(51) Int. Cl.
*F21V 8/00* (2006.01)

(52) U.S. Cl.
CPC ........... *G02B 6/0088* (2013.01); *G02B 6/005* (2013.01); *G02B 6/009* (2013.01); *G02B 6/0091* (2013.01)

(58) Field of Classification Search
CPC ...... G02B 6/005; G02B 6/0088; G02B 6/009; G02B 6/0091
See application file for complete search history.

(56) References Cited

U.S. PATENT DOCUMENTS

| | | | | |
|---|---|---|---|---|
| 6,870,582 B2* | 3/2005 | Hayashimoto | .... | G02F 1/133308 349/58 |
| 6,950,154 B2* | 9/2005 | Lee | ...... | G02B 6/0088 349/58 |
| 7,656,470 B2* | 2/2010 | Yu | ........ | G02B 6/0088 349/58 |
| 8,414,176 B2* | 4/2013 | Shin | ........ | G02B 6/009 362/628 |
| 8,587,746 B2* | 11/2013 | Kim | ...... | G02B 6/0088 349/61 |
| 2005/0195621 A1* | 9/2005 | Chang | ............ | G02F 1/133608 362/634 |

(Continued)

FOREIGN PATENT DOCUMENTS

| CN | 103727453 A | 4/2014 |
|---|---|---|
| CN | 204313140 U | 5/2015 |

(Continued)

*Primary Examiner* — Tsion Tumebo
(74) *Attorney, Agent, or Firm* — CKC & Partners Co., LLC

(57) ABSTRACT

A backlight module is provided. The backlight module includes a back plate, at least one first carrying portion, a light guide plate, at least one optical film and a light source. The back plate has a sidewall. The first carrying portion is disposed on the back plate. The light guide plate is disposed on the back plate. The optical film is disposed above the light guide plate, in which the optical film has a notch which is corresponding to the first carrying portion. The light source is disposed on the back plate, in which the light source is disposed adjacent to a light-incident surface of the light guide plate.

12 Claims, 9 Drawing Sheets

(56) References Cited

U.S. PATENT DOCUMENTS

| | | | | |
|---|---|---|---|---|
| 2007/0008449 A1* | 1/2007 | Choi | ................ | G02F 1/133615 |
| | | | | 349/58 |
| 2008/0055518 A1* | 3/2008 | Jung | ................... | G02B 6/0055 |
| | | | | 349/67 |
| 2009/0262277 A1* | 10/2009 | Kim | ................. | G02F 1/133308 |
| | | | | 349/58 |
| 2010/0177124 A1* | 7/2010 | Ryu | ................ | G02F 1/133308 |
| | | | | 345/690 |
| 2013/0321739 A1* | 12/2013 | Cheng | ..................... | G09F 13/04 |
| | | | | 349/58 |
| 2015/0092385 A1* | 4/2015 | Baek | ................... | G02B 6/0053 |
| | | | | 362/19 |

FOREIGN PATENT DOCUMENTS

| | | |
|---|---|---|
| CN | 205427397 U | 8/2016 |
| CN | 205721003 U | 11/2016 |
| CN | 205942201 U | 2/2017 |
| JP | 2007026842 A | 2/2007 |
| JP | 2009175328 A | 8/2009 |
| WO | 2013181863 A1 | 12/2013 |
| WO | 2017028409 A1 | 2/2017 |

* cited by examiner

BACK LIGHT MODULE AND DISPLAY DEVICE

RELATED APPLICATIONS

This application is a continuation application of International Application No. PCT/CN2017/082834 filed May 3, 2017 which is incorporated herein by reference.

BACKGROUND

Field of Invention

The present invention relates to a light source module. More particularly, the present invention relates to a backlight module and its applications on a display device.

Description of Related Art

A conventional display device mainly includes a backlight module, a mold frame and a display panel. The display panel is held on the backlight module and is supported by the mold frame. The backlight module mainly includes a back plate, a light guide plate, at least one optical film and a light source, in which the light guide plate, the optical film and the light source are disposed in the back plate.

Generally, the back plate has a sidewall which surrounds four its side edges, and the mold frame is fixed between the sidewall of the back plate and the light guide plate. The edge of the mold frame needs to have a certain width for holding the display panel. However, this mold frame structure does not meet the design trend of narrow border display device.

SUMMARY

An object of the invention is to provide a backlight module and a display device to meet the design requirement of the narrow border display device.

According to the aforementioned object, a backlight module is provided. The backlight module includes a back plate, at least one first carrying portion, a light guide plate, at least one optical film and a light source. The back plate has a sidewall. The first carrying portion is disposed on the back plate. The light guide plate is disposed on the back plate. The optical film is disposed above the light guide plate, in which the optical film has a notch which is corresponding to the first carrying portion. The light source is disposed on the back plate, in which the light source is disposed adjacent to a light-incident surface of the light guide plate.

According to an embodiment of the present invention, the first carrying portion is a bent portion which extends from the sidewall towards an inner side of the back plate, and the bent portion is located in the notch.

According to an embodiment of the present invention, a side surface of the optical film is abutted against the sidewall, and the first carrying portion is located in the notch of the optical film.

According to an embodiment of the present invention, the sidewall has a recessed portion, and the first carrying portion is a spacer which is disposed in the recessed portion, and the spacer protrudes from an inner side of the sidewall and is located in the notch.

According to an embodiment of the present invention, the first carrying portion is disposed on a side of the back plate which is located away from the light source.

According to an embodiment of the present invention, the back plate has a first extending direction and a second extending direction vertical to the first extending direction. The first carrying portion is disposed on a corner portion of the back plate, and the first carrying portion has a first carrying unit and a second carrying unit respectively disposed along the first extending direction and the second extending direction.

According to an embodiment of the present invention, the backlight module further comprises a second carrying portion disposed on a side of the back plate which is located near the light source.

According to an embodiment of the present invention, the back plate has a folding structure disposed near the light source, and the light source is engaged between the folding structure and the back plate.

According to the aforementioned object, a display device is provided. The display device includes a backlight module, a plurality of adhesive members and a display panel. The first carrying portion has a first carrying surface, and the sidewall has a top surface. The adhesive members are simultaneously adhered on a top surface of the at least one optical film, the first carrying surface of the first carrying portion and the top surface of the sidewall. The display panel is disposed in front of at least one optical film, in which the display panel is held on the first carrying portion and the sidewall, and the display panel is positioned by the adhesive members.

According to an embodiment of the present invention, a width of the first carrying surface of the first carrying portion is greater than a width of the top surface of the sidewall.

According to an embodiment of the present invention, the first carrying surface of the first carrying portion and the top surface of the sidewall are substantially coplanar.

According to an embodiment of the present invention, the top surface of the optical film and the first carrying surface of the first carrying portion are substantially coplanar.

According to the aforementioned object, a display device is provided. The display device includes a backlight module, a plurality of adhesive members and a display panel. The first carrying portion has a first carrying surface, and the sidewall has a top surface, and the second carrying portion has a second carrying surface. The adhesive members are simultaneously adhered on the top surface of the at least one optical film, the first carrying surface of the first carrying portion and the top surface of the sidewall. The display panel is disposed in front of at least one optical film, in which the display panel is held on the first carrying portion and the sidewall, and the display panel is positioned by the adhesive members.

According to an embodiment of the present invention, the second carrying surface of the second carrying portion and the first carrying surface of the first carrying portion are substantially coplanar.

From the aforementioned embodiments of the present invention, it can be known that the first carrying portion is disposed on the sidewall of the back plate, such that the display panel is firmly held on the first carrying portion and the sidewall of the back plate. Moreover, the optical film has the notch used to receive the first carrying portion, thereby increasing the carrying area of the display panel without needing to increase the frame border width or affecting the area of the display area, thus increasing the reliability of holding the display panel on the back plate.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1A:
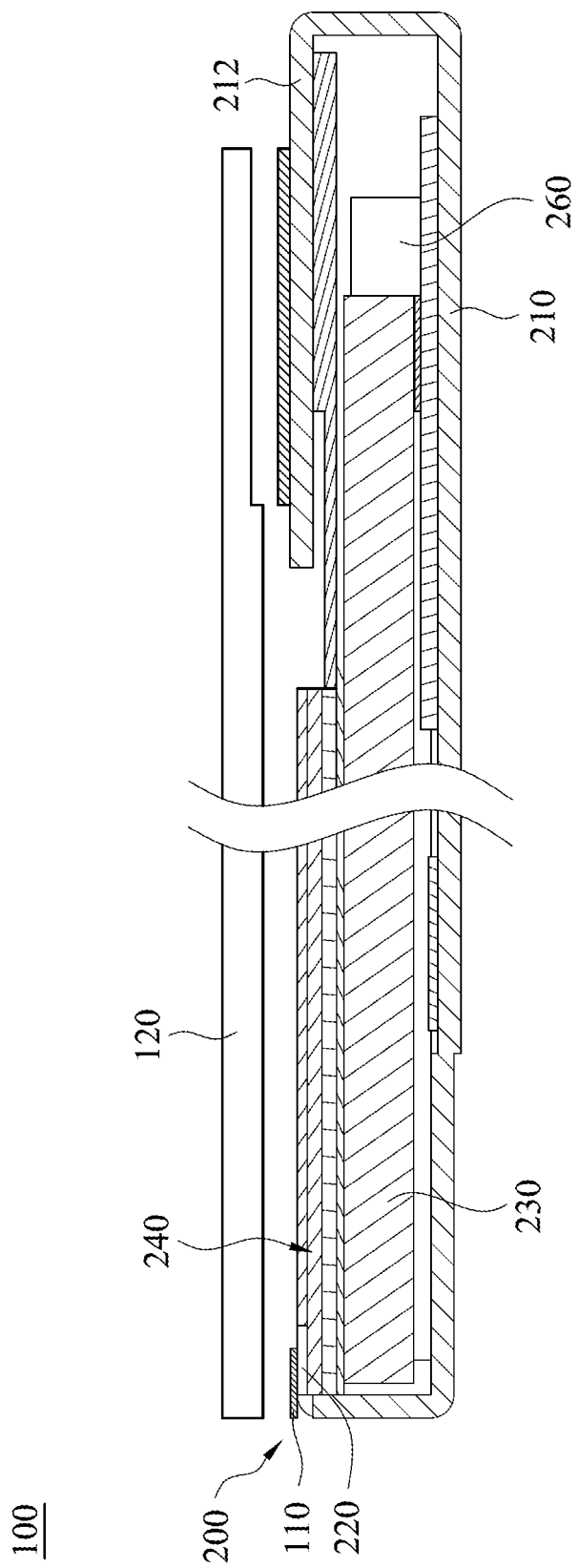
FIG. 1A is a schematic partial structural diagram showing a display device in accordance with a first embodiment of the present invention.

Reference will now be made in detail to the present embodiments of the invention, examples of which are illustrated in the accompanying drawings. Wherever possible, the same reference numbers are used in the drawings and the description to refer to the same or like parts.

Figure 1B:
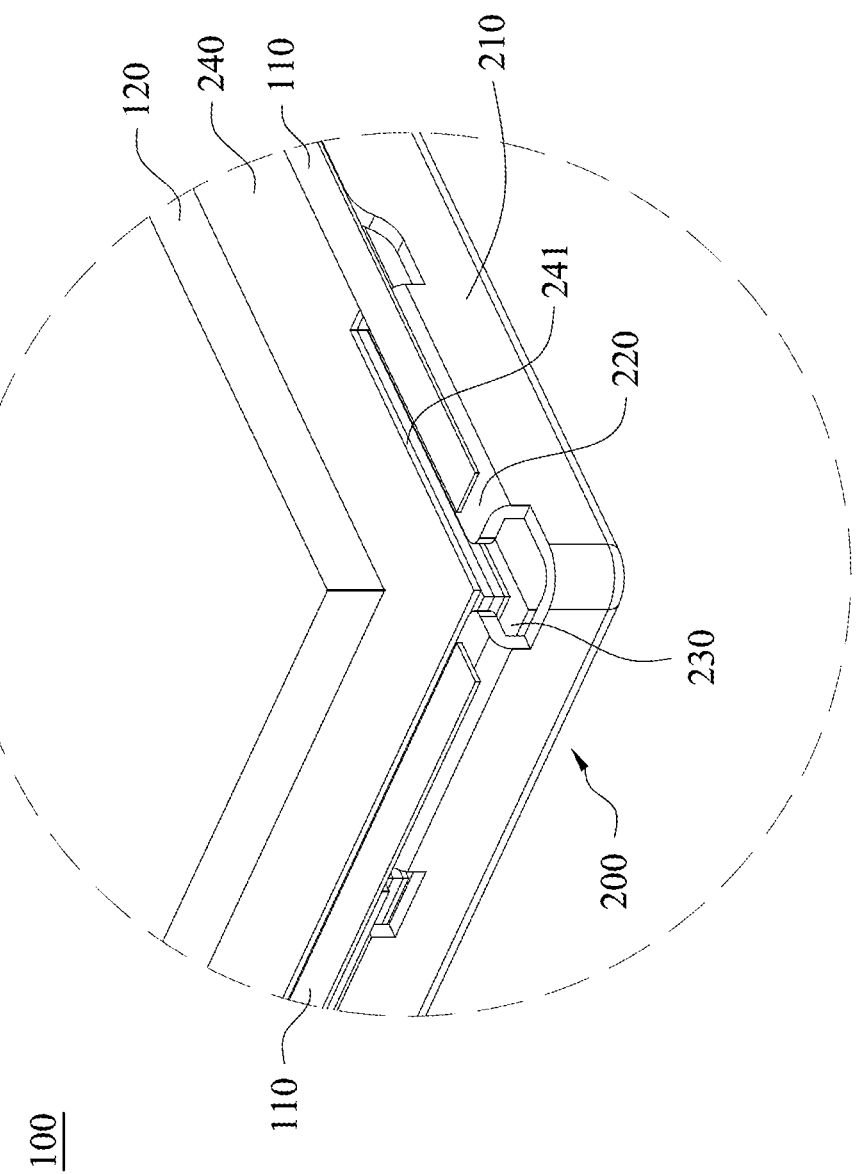
FIG. 1B is another schematic partial structural diagram showing the display device in accordance with the first embodiment of the present invention.

Referring to FIG. 1A and FIG. 1B, FIG. 1A and FIG. 1B are schematic partial structural diagrams showing a display device 100 in accordance with a first embodiment of the present invention. The display device 100 of the present embodiment mainly includes a backlight module 200, plural adhesive members 110 and a display panel 120. The display panel 120 is adhered and fixed on the backlight module 200.

Figure 2:
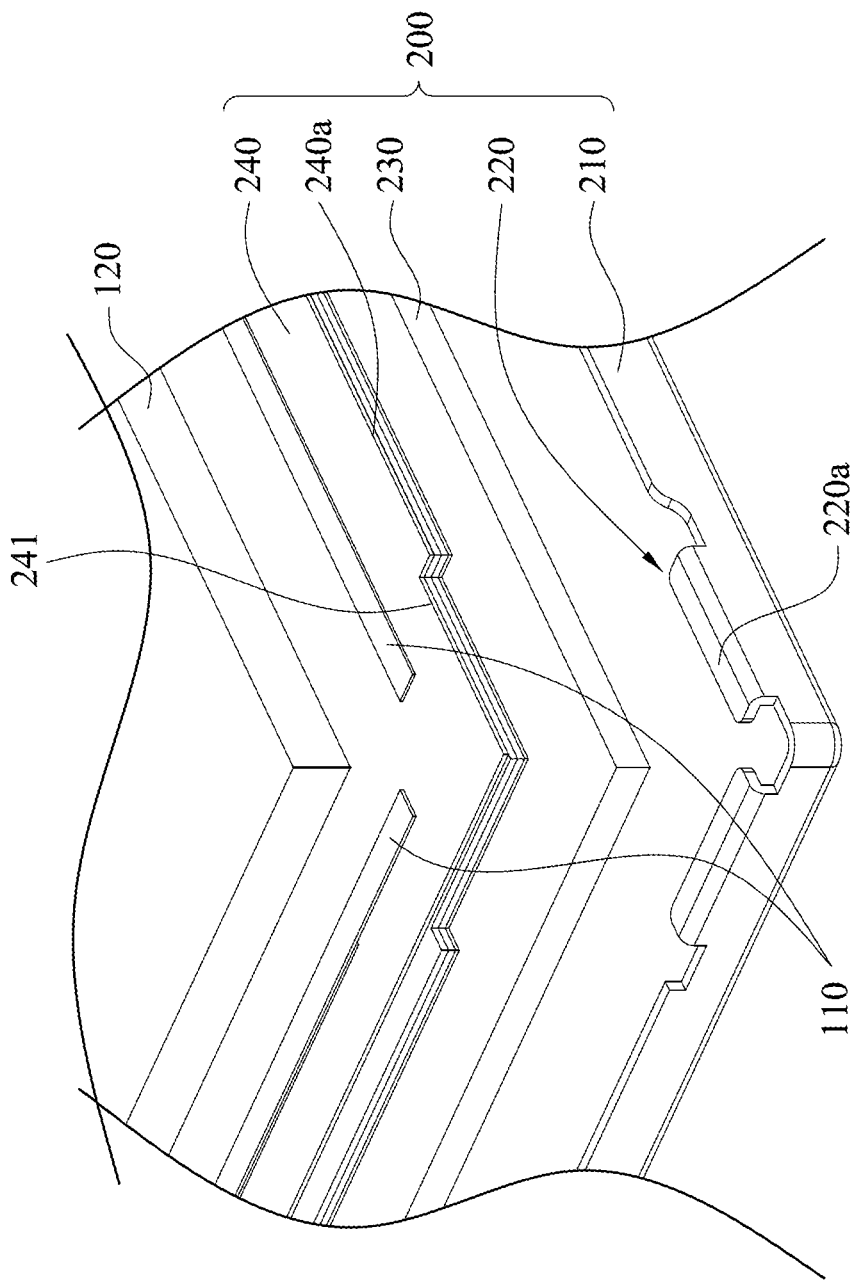
FIG. 2 is a schematic partial exploded view of the display device in accordance with the first embodiment of the present invention.

Simultaneously referring to FIG. 1A to FIG. 2, FIG. 2 is a schematic partial exploded view of the display device 100 in accordance with the first embodiment of the present invention. The backlight module 200 of present embodiment mainly includes a back plate 210, a first carrying portion 220, a light guide plate 230, at least one optical film 240 and a light source 260. The first carrying portion 220, the light guide plate 230 and the light source 260 are disposed on the back plate 210. The light source 260 is disposed adjacent to a light-incident surface of the light guide plate 230. The first carrying portion 220 is mainly used to support the display panel 120 and to position the optical film 240.

Figure 3:
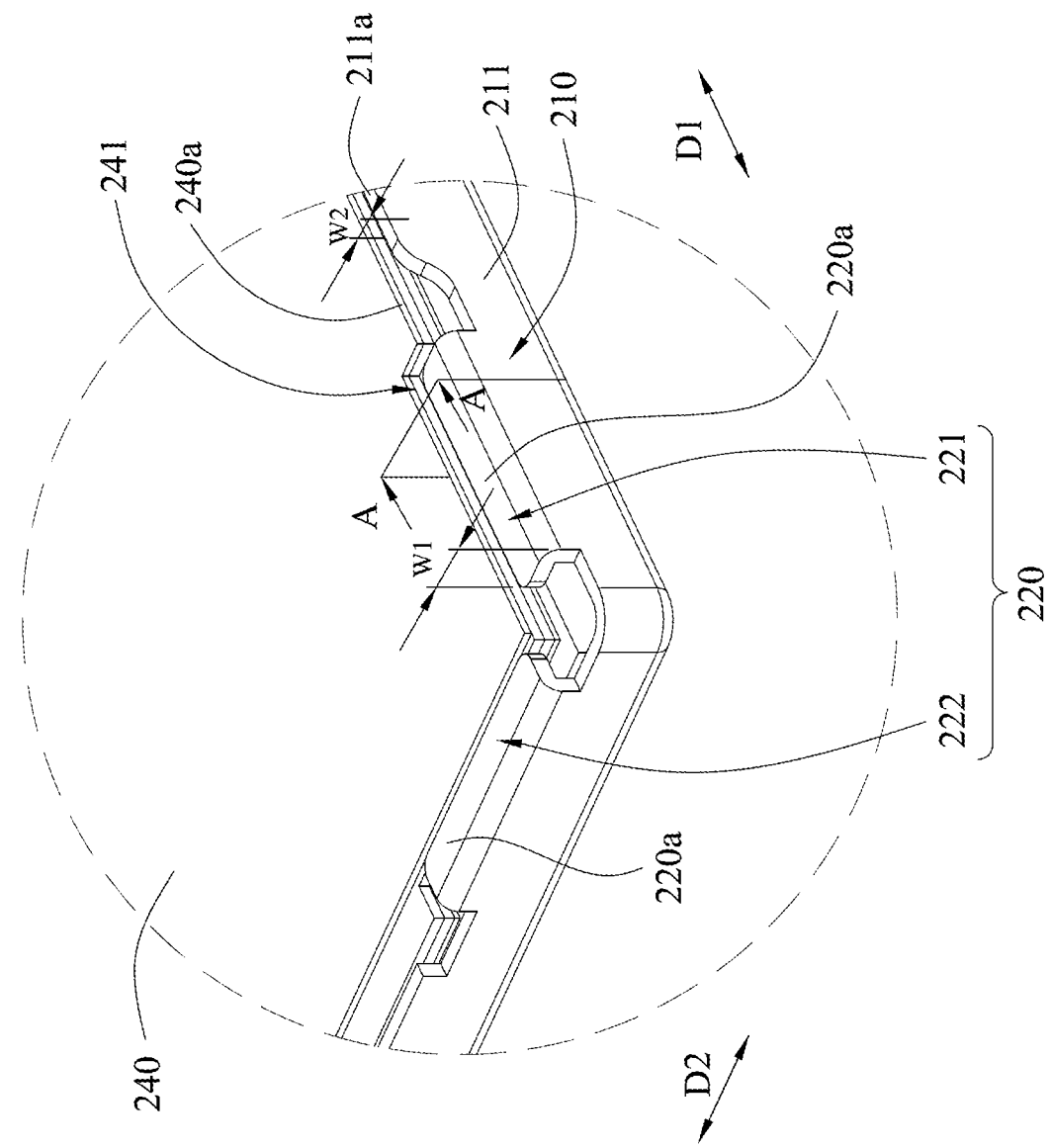
FIG. 3 is a schematic partial structural diagram showing one side of a backlight module away from a light-incident side in accordance with the first embodiment of the present invention.
Figure 4:
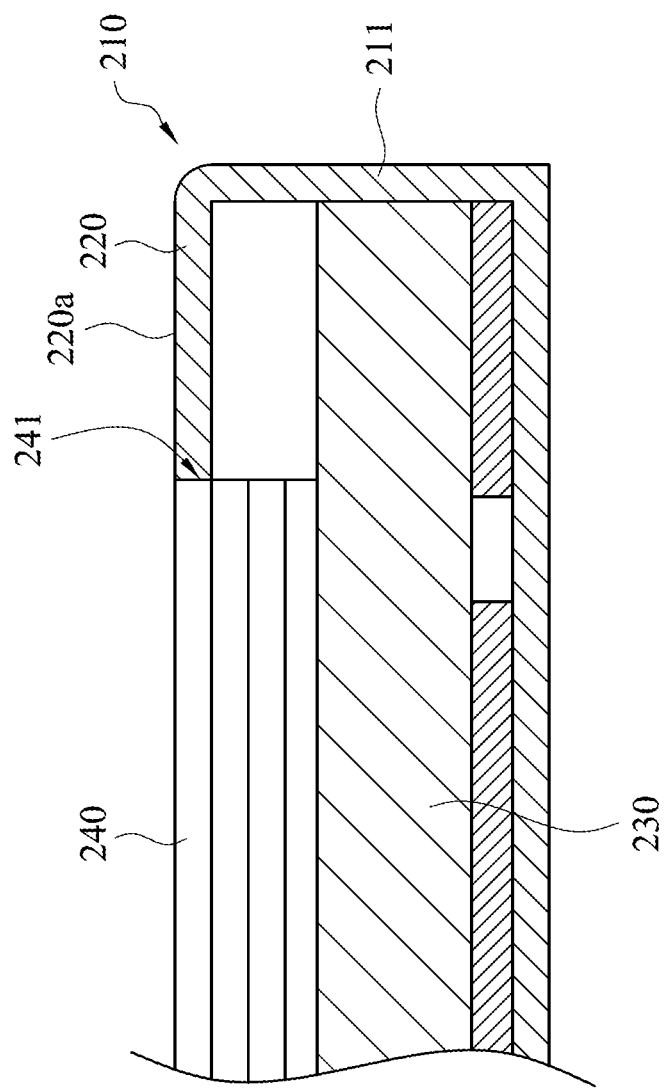
FIG. 4 is a schematic cross-sectional view taken along a line A-A in FIG. 3.

Simultaneously referring to FIG. 1A, FIG. 3 and FIG. 4, FIG. 3 is a schematic partial structural diagram showing one side of the backlight module 200 away from a light-incident side in accordance with the first embodiment of the present invention, and FIG. 4 is a schematic cross-sectional view taken along a line A-A in FIG. 3. In the present embodiment, the first carrying portion 220 is disposed on one side of the back plate 210 which is located away from the light source 260. As shown in FIG. 3, the back plate 210 has a sidewall 211. In the present embodiment, the first carrying portion 220 is a bent portion which extends from a portion of the sidewall 211 towards an inner side of the back plate 210. In some embodiments, the first carrying portion 220 is a plastic spacer made of PET which can be mounted to the back plate 210. In other embodiments, the first carrying portion 220 is a portion of a mold frame of the backlight module 200. The bent portion extending from the sidewall 211 towards the inner side of the back plate 210 and the plastic spacer mounted on the back plate 210 can be used to replace the conventional mold frame, thereby reducing the overall width of the frame of the backlight module to meet the design requirement of the narrow border display device. As shown in FIG. 4, the light guide plate 230 and the optical film 240 are disposed at the inner side of the sidewall 211. The light guide plate 230 is disposed below the first carrying portion 220. The optical film 240 is disposed on the light guide plate 230. As shown in FIG. 3, the optical film 240 has a notch 241, and the first carrying portion 220 is located in the notch 241.

More specifically, as shown in FIG. 3, a side surface of optical film 240 without the notch 241 is abutted against the sidewall 211, and the inner surface of the notch 241 is abutted against the first carrying portion 220. In other words, the first carrying portion 220 extending from the sidewall 211 of the back plate 210 has a function of positioning the optical film 240. In addition, the first carrying portion 220 is capable of supporting the display panel 120 shown in FIG. 1B. Moreover, because the first carrying portion 220 is received in the notch 241 of the optical film 240, a carrying area of the display panel 120 can be increased without needing to increase the overall border width of the backlight module 200. Furthermore, workers can align the notch 241 of the optical film 240 with the first carrying portion 220 and use the first carrying portion 220 to position the optical film 240, so that the optical film 240 can be placed in the correct position.

As shown in FIG. 3, in the present embodiment, the first carrying portion 220 has a first carrying surface 220a, and the first carrying surface 220a and a top surface 211a of the sidewall 211 are substantially coplanar. In the present embodiment, the number of the optical film 240 is more than one. When the optical films 240 are stacked and are disposed on the light guide plate 230, a top surface of the top one of the optical films 240, the first carrying surface 220a of the first carrying portion 220 and the top surface 211a of the sidewall 211 are substantially coplanar. Therefore, as shown in FIG. 1B and FIG. 3, the adhesive members 110 can be adhered on the first carrying surface 220a of the first carrying portion 220, the top surface 211a of the sidewall 211 and the top surface of the optical film 240, so as to fix the optical film 240 to the back plate 210. In one example, the adhesive members 110 are double-sided adhesive tapes, so that the display panel 120 can be firmly adhered on back plate 210 by the adhesive members 110. In one embodiment, a width W1 of the first carrying surface 220a is greater than a width W2 of the top surface 211a of the sidewall 211, thus increasing the reliability of holding the display panel 120 on the back plate 210.

It is noted that, when the first carrying surface 220a and the top surface 211a of the sidewall 211 are substantially coplanar, and each of the adhesive members 110 has a uniform thickness, the display panel 120 can be adhered on the back plate 210 horizontally. In other examples, if the first carrying surface 220a and the top surface 211a of the sidewall 211 are not coplanar, each of the adhesive members 110 can be designed to have two different thicknesses. Therefore, one portion of each adhesive member 110 with a greater thickness can be adhered on a lower one of the first carrying surface 220a and sidewall 211, and the other portion of each adhesive member 110 with a smaller thickness can be adhered on a higher one of the first carrying surface 220a and sidewall 211, so that the display panel 120 can be adhered on the back plate 210 horizontally. In addition, each of the adhesive members 110 can be adhesive members having soft texture. Therefore, when the display panel 120 is adhered on the adhesive members 110, the adhesive members 110 can be compressed to be received in the space between the first carrying surface 220a and the top surface 211a which are not substantially coplanar. In other embodiments, even though the first carrying surface 220a and the top surface 211a of the sidewall 211 are substantially coplanar, and the display panel 120 has a non-uniform thickness, the adhesive members with different thicknesses can be used to adhere the display panel 120 to the back plate 210 horizontally.

Referring to FIG. 1A to FIG. 3, in some embodiments, the first carrying portion 220 is a corner portion of the back plate 210 which is located away from the light source 260. The back plate 210 has a first extending direction D1 and a second extending direction D2 vertical to each other. The first carrying portion 220 includes a first carrying unit 221 and a second carrying unit 222, and the first carrying surface 220a can be defined a top surface of the first carrying unit 221 and a top surface of the second carrying unit 222. The first carrying unit 221 extends along the first extending direction D1, the second carrying unit 222 extends along the second extending direction D2. In one example, the first extending direction D1 is vertical to the second extending direction D2. In other words, the first carrying portion 220 is an L-shaped structure which is a sectional type structure as shown in FIG. 1B to FIG. 3. In other embodiments, the L-shaped structure can be an integral type structure. Moreover, the notch 241 of the optical film 240 can be designed to be an L-shaped notch (as shown in FIG. 2) corresponding to the first carrying portion 220. Therefore, corner portions of the display panel 120 can be supported by the first carrying unit 221 and the second carrying unit 222.

Figure 5:
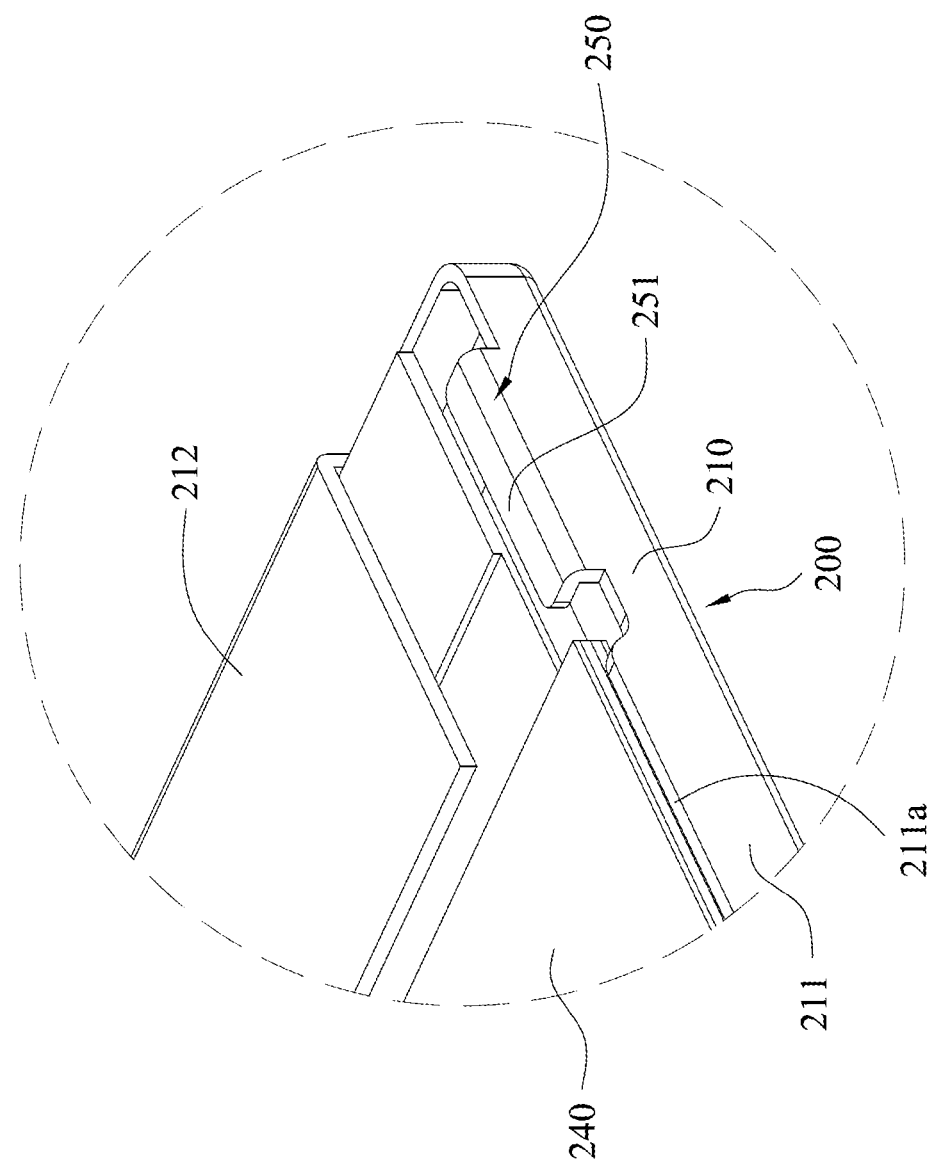
FIG. 5 is a schematic partial structural diagram showing the other side of the backlight module near the light-incident side in accordance with the first embodiment of the present invention.

Referring to FIG. 1A and FIG. 5, FIG. 5 is a schematic partial structural diagram showing the other side of the backlight module 200 near the light-incident side in accordance with the first embodiment of the present invention. In some embodiments, the backlight module 200 further includes a second carrying portion 250, and the second carrying portion 250 is disposed on the back plate 210. In one example, the second carrying portion 250 is a bent portion which extends from the sidewall 211 towards the inner side of the back plate 210, and the second carrying portion 250 has a second carrying surface 251. In some embodiments, the second carrying portion 250 is a plastic spacer made of PET which can be mounted to the back plate 210. In other embodiments, the second carrying portion 250 is a portion of a mold frame of the backlight module 200. The second carrying surface 251, the first carrying surface 220a of the first carrying portion 220 and the top surface 211a of the sidewall 211 are substantially coplanar, so that the display panel 120 can be adhered on the back plate 210 horizontally.

Referring to FIG. 1A and FIG. 5 again, the back plate 210 has a folding structure 212 disposed near the light source 260, and the light source 260 is engaged between the folding structure 212 and the back plate 210. In one embodiment, a surface of the folding structure 212 and the second carrying surface 251 of the second carrying portion 250 are substantially coplanar, so as to horizontally support the display panel 120 as shown in FIG. 1A.

Figure 6:
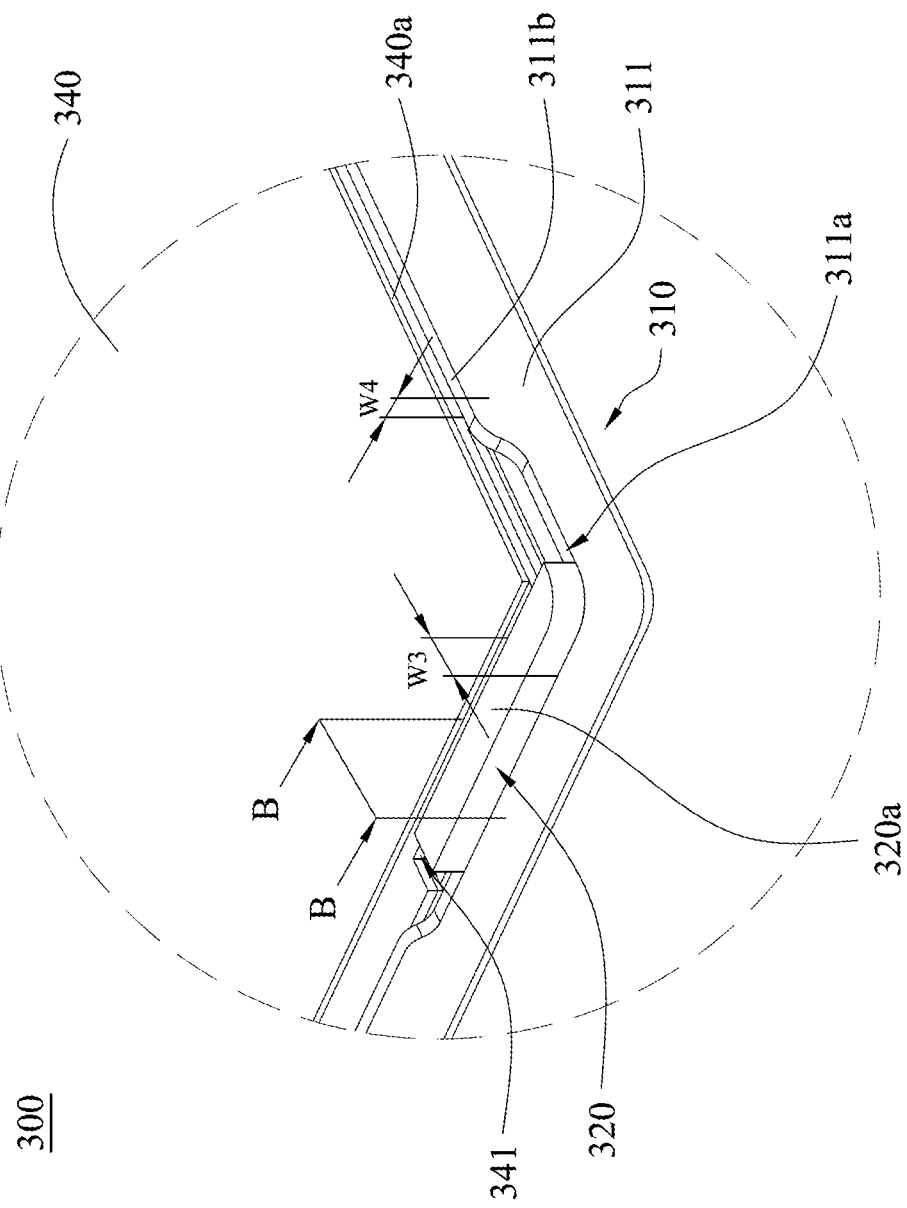
FIG. 6 is a schematic partial structural diagram showing one side of a backlight module away from a light-incident side in accordance with a second embodiment of the present invention.
Figure 7:
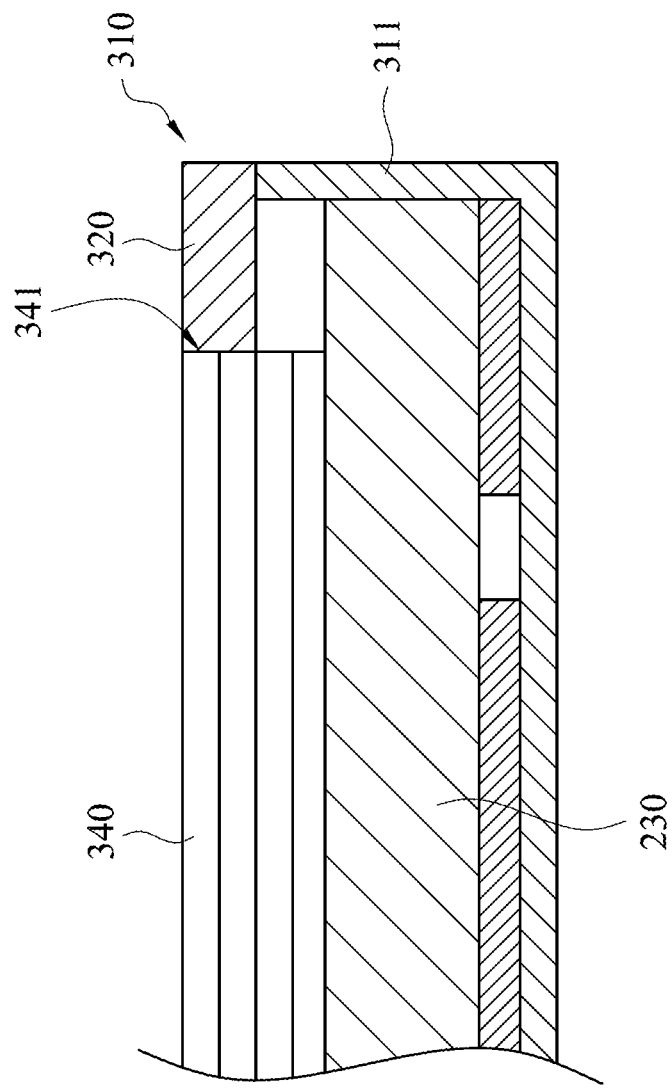
FIG. 7 is a schematic cross-sectional view taken along a line B-B in FIG. 6.

In the present invention, the back plate and the first carrying portion may have different designs. Referring to FIG. 6 and FIG. 7, FIG. 6 is a schematic partial structural diagram showing one side of a backlight module 300 away from a light-incident side in accordance with a second embodiment of the present invention, and FIG. 7 is a schematic cross-sectional view taken along a line B-B in FIG. 6. The structure of the backlight module 300 of the present embodiment is similar to that of the aforementioned backlight module 200, and the main difference therebetween is that a back plate 310, a first carrying portion 320 and an optical film 340 of the backlight module 300 have different designs.

Referring to FIG. 6 and FIG. 7 again, a sidewall 311 of the back plate 310 has a recessed portion 311a, and the first carrying portion 320 is a spacer which is disposed in the recessed portion 311a. As shown in FIG. 7, when the first carrying portion 320 is disposed on the sidewall 311 of the back plate 310, one side of the first carrying portion 320 is aligned with an outer surface of the sidewall 311, and the other side of the first carrying portion 320 protrudes from an inner side of the sidewall 311. As shown in FIG. 7, the light guide plate 230 is disposed below the first carrying portion 320, and the optical film 340 is disposed on the light guide plate 230. In the present embodiment, the optical film 340 has a notch 341 corresponding to the first carrying portion 320, so that a side surface 340a of optical film 340 without the notch 341 is abutted against the sidewall 211, and the notch 341 of the optical film 340 is abutted against the first carrying portion 320. In other words, when the optical film 340 is disposed on the light guide plate 230, the first carrying portion 320 is received in the notch 341. Therefore, workers can align the notch 341 of the optical film 340 with the first carrying portion 320 and use the first carrying portion 320 to position the optical film 340, so that the optical film 340 can be placed in the correct position.

Figure 8:
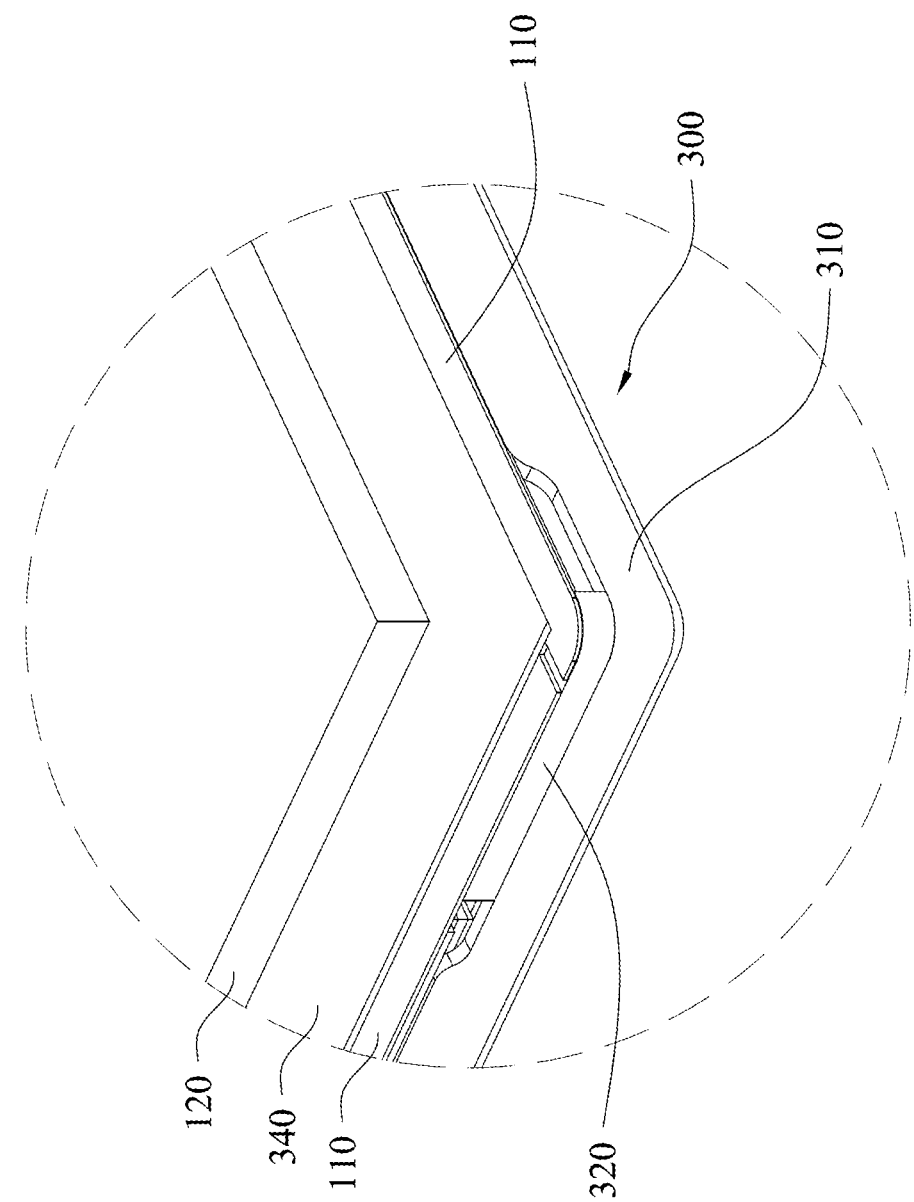
FIG. 8 is a schematic partial structural diagram showing a display device in accordance with a second embodiment of the present invention.

Referring to FIG. 6 and FIG. 8, FIG. 8 is a schematic partial structural diagram showing a display device in accordance with a second embodiment of the present invention. In one embodiment, the first carrying surface 320a of the first carrying portion 320 and the top surface 311b of the sidewall 311 are substantially coplanar. The adhesive members 110 are adhered on the first carrying surface 320a and the top surface 311b of the sidewall 311. Therefore, the display panel 120 can be held on and adhered to the back plate 310 horizontally. In other words, the first carrying portion 320 is capable of supporting the display panel 120. Moreover, because the first carrying portion 220 is received in the notch 341 of the optical film 340, a carrying area of the display panel 120 can be increased without needing to increase the border width of the backlight module 300. In addition, in one embodiment, a width W3 of the first carrying surface 320a is greater than a width W4 of the top surface 311b of the sidewall 311, so that an adhering area of the adhesive members 110 can be increased accordingly.

It is noted that, in the present embodiment, the backlight module 300 also includes the second carrying portion 250 as shown in FIG. 5, so as to achieve the objectives of supporting the display panel 120 as described above and will not be described therein.

From the aforementioned embodiments of the present invention, it can be known that the first carrying portion is disposed on the sidewall of the back plate, such that the display panel is firmly held on the first carrying portion and the sidewall of the back plate. Moreover, the optical film has the notch used to receive the first carrying portion, thereby increasing the carrying area of the display panel without needing to increase the frame border width or affecting the area of the display area, thus increasing the reliability of holding the display panel on the back plate.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A display device, comprising:
   a backlight module comprising:
   a back plate having a sidewall, wherein the sidewall has a top surface;
   at least one first carrying portion disposed on the back plate, wherein the first carrying portion has a first carrying surface;
   a light guide plate disposed on the back plate;
   at least one optical film disposed above the light guide plate, wherein the optical film has a notch which is corresponding to the first carrying portion; and
   a light source disposed on the back plate, wherein the light source is disposed adjacent to a light-incident surface of the light guide plate;
   wherein the first carrying surface of the first carrying portion and the top surface of the sidewall are substantially coplanar;
   a plurality of adhesive members simultaneously adhered on a top surface of the at least one optical film, the first carrying surface of the first carrying portion and the top surface of the sidewall; and
   a display panel disposed in front of at least one optical film, wherein the display panel is held on the first carrying portion and the
   sidewall, and the display panel is positioned by the adhesive members.

2. The display device of claim 1, wherein the first carrying portion is a bent portion which extends from the sidewall towards an inner side of the back plate, and the bent portion is located in the notch.

3. The display device of claim 1, wherein a side surface of the optical film is abutted against the sidewall, and the first carrying portion is located in the notch of the optical film.

4. The display device of claim 1, wherein the sidewall has a recessed portion, and the first carrying portion is a spacer which is disposed in the recessed portion, and the spacer protrudes from an inner side of the sidewall and is located in the notch.

5. The display device of claim 1, wherein the first carrying portion is disposed on a side of the back plate which is located away from the light source.

6. The display device of claim 1, wherein
   the back plate has a first extending direction and a second extending direction vertical to the first extending direction; and
   the first carrying portion is disposed on a corner portion of the back plate, and the first carrying portion has a first carrying unit and a second carrying unit respectively disposed along the first extending direction and the second extending direction.

7. The display device of claim 1, wherein the backlight module further comprises:
   a second carrying portion disposed on a side of the back plate which is located near the light source.

8. The display device of claim 1, wherein the back plate has a folding structure disposed near the light source, and the light source is engaged between the folding structure and the back plate.

9. The display device of claim 1, wherein a width of the first carrying surface of the first carrying portion is greater than a width of the top surface of the sidewall.

10. The display device of claim 1, wherein the top surface of the optical film and the first carrying surface of the first carrying portion are substantially coplanar.

11. A display device, comprising:
    a backlight module comprising:
    a back plate having a sidewall, wherein the sidewall has a top surface;
    at least one first carrying portion disposed on the back plate, wherein the first carrying portion has a first carrying surface;
    a light guide plate disposed on the back plate;
    at least one optical film disposed above the light guide plate, wherein the optical film has a notch which is corresponding to the first carrying portion;
    a light source disposed on the back plate, wherein the light source is disposed adjacent to a light-incident surface of the light guide plate;
    a second carrying portion disposed on a side of the back plate which is located near the light source, wherein the second carrying portion has a second carrying surface;
    wherein the first carrying surface of the first carrying portion and the top surface of the sidewall are substantially coplanar;
    a plurality of adhesive members simultaneously adhered on a top surface of the at least one optical film, the first carrying surface of the first carrying portion, the second carrying surface of the second carrying portion, and the top surface of the sidewall; and
    a display panel disposed in front of the at least one optical film, wherein the display panel is held on the first carrying portion, the second carrying portion, and the sidewall, and the display panel is positioned by the adhesive members.

12. The display device of claim 11, wherein the second carrying surface of the second carrying portion and the first carrying surface of the first carrying portion are substantially coplanar.

* * * * *